United States Patent [19]
Nelson et al.

[11] Patent Number: 5,535,081
[45] Date of Patent: Jul. 9, 1996

[54] IMMOBILIZER FOR A DATA STORAGE DISK IN A CARTRIDGE USING AN OVERCENTER SPRING

[75] Inventors: Kenneth J. Nelson, Santa Clara; Michael C. McGrath, Pleasanton; Timothy O. Avery, San Jose, all of Calif.

[73] Assignee: Avatar Systems Corporation, Milpitas, Calif.

[21] Appl. No.: 371,422

[22] Filed: Jan. 11, 1995

[51] Int. Cl.[6] ................................................ G11B 23/03
[52] U.S. Cl. ................................................ 360/133
[58] Field of Search ................................................ 360/133

[56] References Cited

U.S. PATENT DOCUMENTS

4,550,355  10/1985  Larson ........................ 360/133
4,899,244  2/1990  Morse ........................ 360/133

Primary Examiner—A. J. Heinz
Attorney, Agent, or Firm—Pillsbury Madison & Sutro

[57] ABSTRACT

An engagement interface between a removable cartridge containing a rigid disk for storage of data and a disk drive that maintains the disk immobilized during insertion into the disk drive so that the drive can be oriented in any direction with respect to gravity. The cartridge includes an opening for a hub of the disk for spinning and the disk drive has a magnetic spindle with connecting mechanism for extending the spindle into contact with the hub and retracting it out of contact. The cartridge also includes an overcenter disk immobilizer to hold the disk with its hub centered in the opening when the cartridge is outside the disk drive and to release the disk when the cartridge is within the disk drive and the hub is engaging the spindle.

20 Claims, 6 Drawing Sheets

IMMOBILIZER FOR A DATA STORAGE DISK IN A CARTRIDGE USING AN OVERCENTER SPRING

FIELD OF THE INVENTION

The present invention relates to disk drives with removable cartridges containing relatively rigid media to store data in a personal computer.

BACKGROUND OF THE INVENTION

Removable disks included in protective cartridges have been available for some time. Generally, the protective cartridges include either a flexible disk or a relatively rigid disk. Typical flexible disk cartridges as shown in U.S. Pat. Nos. 4,445,155 to Takahashi, et al.; 4,445,157 to Takahashi; 4,546,397 to Asami, et al; 4,573,093 to Obama, et al; and 4,675,758 to Tanaka. Rigid disk cartridges are shown in U.S. Pat. Nos. 4,488,187 to Alaimo; 4,503,474 to Nigam; 4,504,879 to Toldi, et al.; 4,683,506 to Toldi, et al.; 4,717,981 to Nigam, et al; 4,722,012 to Toldi, et al.; 4,864,452 to Thompson, et al.; 4,870,518 to Thompson, et al.; 4,864,437 to Couse, et al.; 4,920,462 to Couse, et al.; 4,965,685 to Thompson, et al.; and 4,965,691 to Iftikar, et al. Although optical disks are possible, usually such flexible (floppy) and rigid (hard) disks are coated with suitable magnetic media, for writing data and reading data therefrom. Each disk is surrounded by a housing designed to prevent contamination or damage to the magnetic media of the disk. Some floppy disk cartridges just have a window to allow access, but for a rigid or hard disk cartridge, the housing must have an access shutter or other type of door to prevent contamination or damage. The shutter is opened when the cartridge is inserted into a disk drive mechanism, to allow the read/write heads access to the disk, and closed when the cartridge is ejected. The heads move in and out linearly or arcuately across the disk. In floppy disk drives, the heads are designed to lightly touch the magnetic media. In hard disk drives, the heads float on a thin layer of air so they never touch the disk while it is spinning. Because of the head contact, floppy disks tend to wear out after a short time and the drives occasionally need their heads cleaned, while hard disks can last the lifetime of the computer to which they are connected. In hard disk drives, environmental contamination may be reduced by providing seals about the access shutter and adjacent a hub used to spin the disk.

Generally, the requirements for a disk cartridge are: protect the disk from damage and contamination, provide access for the read/write heads on both sides of the contained disk, provide access for drive means to spin the disk, provide rigidity sufficient to assure that normal stresses do not cause the housing to bend and come into contact with the disk, provide means to control movement of the disk within the cartridge when the cartridge is outside its drive, and do all of this in minimum volume. In addition, some sort of mechanism is usually provided to retain the shutter closed except when the cartridge is in the relative clean and safe environment within a disk drive. Cartridges typical of those available in the prior art are disclosed in U.S. Pat. Nos. 4,864,452 and 4,503,474. The cartridge arrangement shown in the '474 patent is for use with a disk drive containing heads that are movable in relationship to the disk by means of a linear device, such as a stepper motor or a linear voice coil motor, which are generally expensive and not particularly versatile or fast. The cartridge shown in the '452 patent is for use with a radial arm voice coil actuator, which is economical and efficient, but requires a larger opening and is more difficult to align from drive to drive.

The housings of hard disk cartridges usually are constructed from plastic material, which must be relatively thick to withstand day-to-day abuse. The housing also must be relatively thick to support a shutter and to allow the insertion of the read/write heads within the sides thereof. The shutter of such a housing usually opens an edge because enough structural support cannot be provided to allow a corner to be missing. The resulting cartridges are bulky, heavy and have dimensions which are too big to fit into a shirt pocket.

Modern floppy disk drives merely require insertion of a cartridge through a slot and springs and linkages within the drive thereafter properly position the cartridge in the drive. In some instances, a knob or button must be manipulated to connect a rotational drive motor to the disk and to bring the heads into contact with the magnetic media. Removable cartridge hard disk drives use similar linkages and also motors and solenoids, but usually require the manipulation of a lever to seat and eject the cartridge. The motors and solenoids use electrical power, and cause excessive current drain that is undesirable for battery powered laptop and notebook personal computers.

Therefore, there has been a need to provide a disk drive with a removable cartridge which is small and thin, is capable of operating quickly at extremely high data densities, which uses almost no electrical power for cartridge insertion and ejection, which is rugged and relatively immune to physical damage, and can reliably establish a mechanical interface between the disk within the cartridge and the disk drive no matter what the orientation of the cartridge with respect to gravity without requiring a complex series of manual manipulations.

SUMMARY OF THE INVENTION

The present invention is an improved protective cartridge that uses an "over center" snap spring to protect its disk from shock, vibration and other motion, to assure proper positioning of a small, thin, high data density hard disk therewithin for mechanical interface between the disk and a disk drive during mounting of the disk to the disk drive for spinning.

Prototype models of disk drives, with the present cartridge, allow the storage of over 170 megabytes of data at less than 15 milliseconds average access time. The cartridge requires a generally rectangular area, about 2¾" wide by 3" deep by 3/16" thick. The cartridge includes a peripheral frame, generally the shape of three quarters of a rectangle, that is, about half of two sides and the included corner are nonexistent. The frame supports a pair of stainless steel or robust plastic walls on each side of a disk centered therewithin, the double walls giving the cartridge extreme rigidity and also providing magnetic shielding to the disk when made from stainless steel. The walls and frame define a window extending about 90° around the periphery of the rectangle and inwardly almost to the hub of the disk to expose the ring shaped read/write areas on opposite sides of the disk. A shutter is mounted to be pivoted by an actuation arm of the drive between a closed position where the disk is totally enclosed, and an open position where free access is provided for read/write heads through the window.

The shutter has an outer periphery, with two inwardly extending walls which extend between the inner/outer sheets on both sides. The shutter and the housing interact to provide labyrinth seals to inhibit contamination from entering the interior of the housing and damaging the disk. The sidewalls of the shutter, preferably are made from thin stainless steel for rigidity and also to provide magnetic shielding. The arcuate shaped outer periphery of the shutter is concentric with the outer cylindrical edge of the disk so that it can retract within the housing in a minimal space. By having an entire corner of the cartridge openable without sidewalls to interfere with the action of the read/write heads of the disk drive, and by using a rigid double wall construction, the cartridge can be extremely thin, requiring little clearance for the disk.

One of the pairs of housing walls includes a hub hole therethrough so that the hub of the disk can be engaged by a spindle which is extended into magnetic contact therewith when the cartridge is inserted in the disk drive. Abutment surfaces are provided on the hub and about the hub hole for securing the disk in a stable position when it is removed from the disk drive. An overcenter snap spring forces the hub toward the hub hole and retains the abutment surfaces together which immobilizes the disk and maintains its proper positioning for the next time it is inserted in a disk drive. This also closes the opening to inhibit contamination from entering the cartridge. The overcenter snap spring is activated by a cam connected to the shutter and a cam follower connected to the snap spring so that when the shutter is closed as the cartridge is being removed from the drive, the spring is forced to snap to its hub retention position. The cam thereafter blocks its snap spring from being moved over center to release the disk until the shutter is opened. When next inserted in the disk drive, the cam is moved out of the way by the opening of the shutter. When the spindle is about to engage the hub, its centering protrusion contacts a button mounted at the center of the spring, which extends through a centering orifice in the hub into contact therewith. As the spindle engages the hub, the button forces the spring over center to release the disk.

The present invention thereby provides means to secure the disk hub in a suitable position during drive insertion for engagement by the spindle no matter what the orientation of the cartridge or the drive with respect to gravity.

Thus, it is an object of the present invention to provide a high density data storage device in a minimal envelope that can be used in any orientation with respect to gravity.

Another object is to provide a user friendly insertion and ejection interface between a hard disk cartridge and a disk drive which is economical to manufacture, reliable in service and which requires almost no electrical power.

Another object is to provide a manually insertable removable hard disk cartridge and the interface mechanism therefore whose orientation with respect to gravity need not be controlled.

Another object is to provide a removable hard disk cartridge and a disk drive having movement restraint means which allows both to be extremely thin and small without reducing reliability of the disk.

These and other objects and advantages of the present invention will become apparent to those skilled in the art after considering the following detailed specification, together with the accompanying drawings, wherein:

DETAILED DESCRIPTION OF THE SHOWN EMBODIMENT

Figure 1:
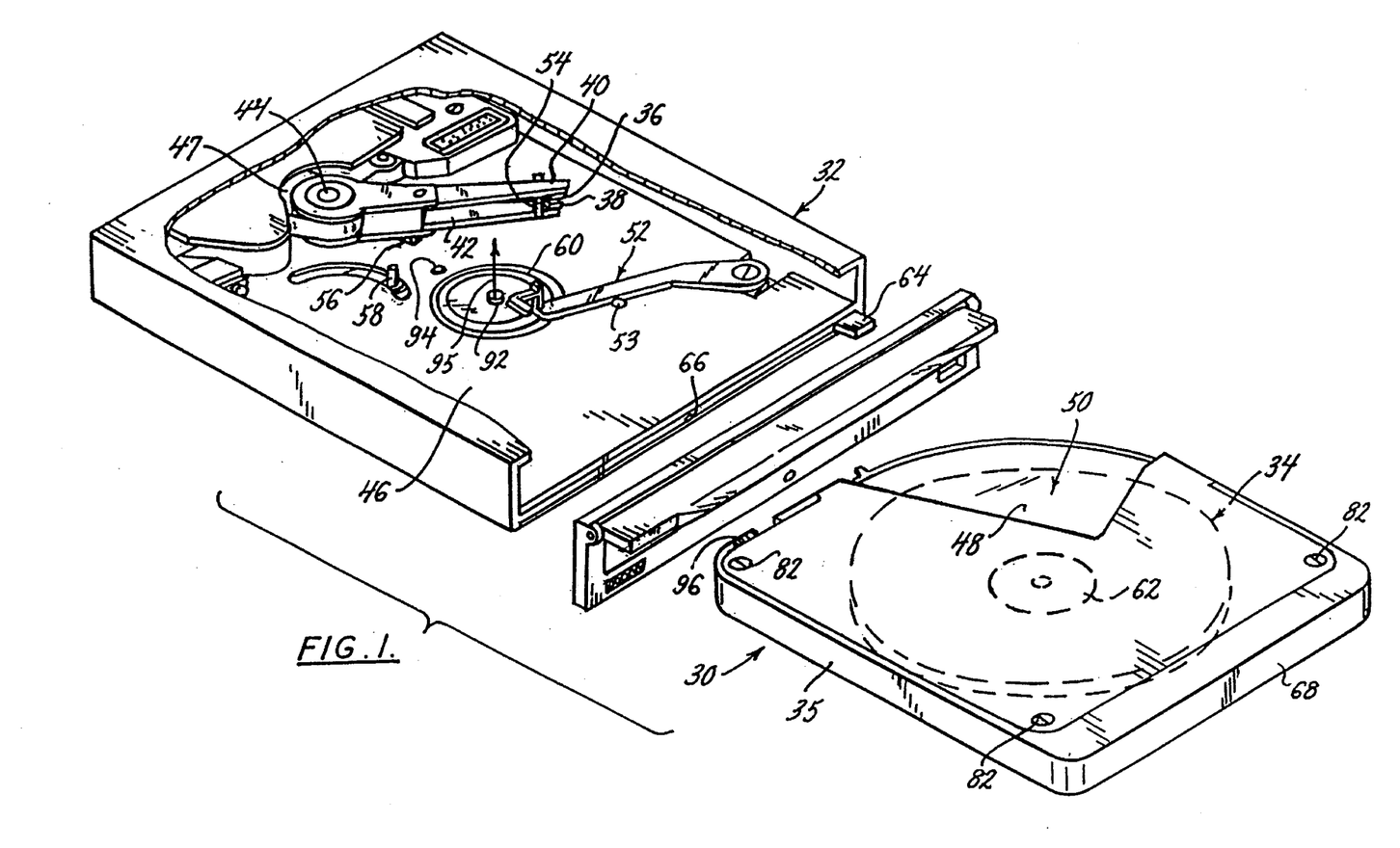
FIG. 1 is a partially cutaway perspective view of the cartridge of the present invention in position to be inserted into a disk drive.

Referring to the drawings more particularly by reference numbers, number 30 in FIG. 1 refers to a hard disk cartridge constructed according to the present invention. Such cartridges store digital data in magnetic media, although the cartridge 30 could be used with flexible magnetic media or optical media. The removable cartridge 30 is for use with the disk drive 32. In FIG. 1, the cartridge 30 is shown positioned for insertion into the disk drive 32. Although the cartridge 30 is shown in its normal horizontal position, and hereinafter unless otherwise stated, such positioning is assumed, the cartridge 30 and disk drive 32 can be used in any orientation with respect to gravity. The cartridge 30 includes a disk 34, which is surrounded by a housing 35 to prevent physical damage or contamination thereof. Since data is placed on very small areas of the disk 34 with great precision, contamination, such as 0.1 to 0.3 micron particles, can quickly destroy the capability of the disk 34 to store data and damage the heads 36 and 38, used to read and write the data. Therefore, the housing 35 completely surrounds the disk 34 when the cartridge 30 is outside the drive 32 and exposed to the elements, as shown in FIG. 1. However, for use, the disk 34 must be accessible to the read/write heads 36 and 38 in the drive 32. The heads 36 and 38 are positioned at the ends of arms 40 and 42, respectively, which rotate together about a pivot 44 on the base 46 of the drive 32 and are driven by a rotary voice coil actuator 47.

Figure 2:
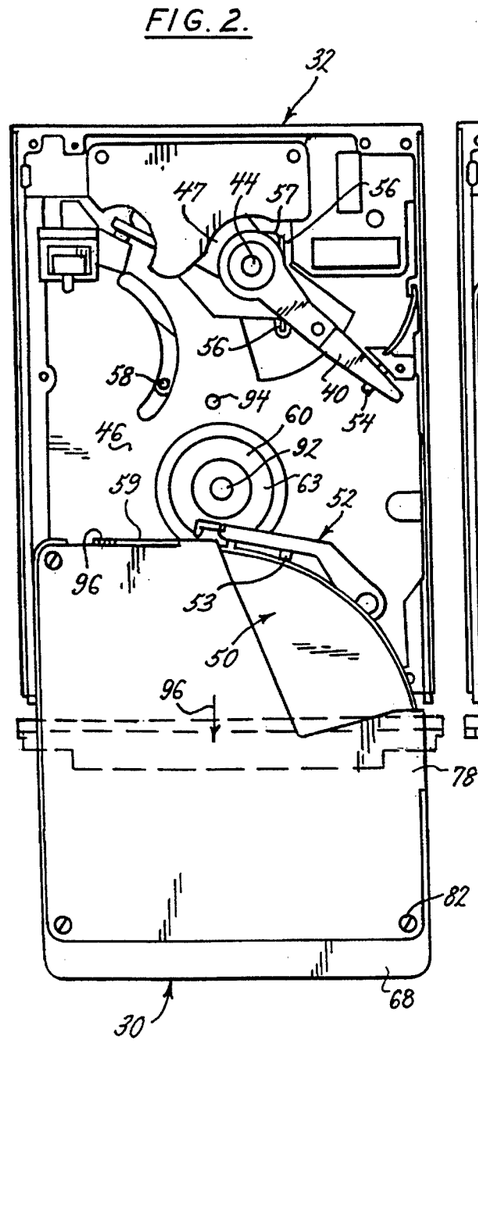
FIG. 2 is a top plan view of the disk drive of FIG. 1 with its top cover removed and a cartridge partially inserted therein.
Figure 3:
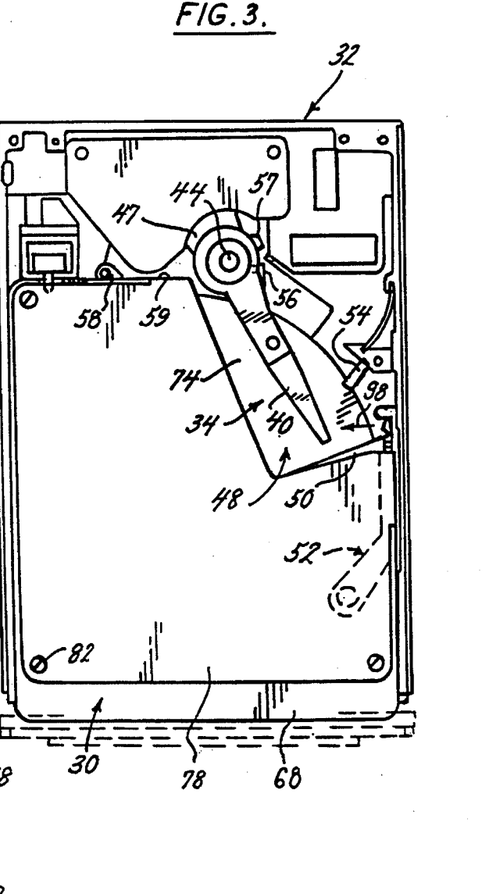
FIG. 3 is a top plan view similar to FIG. 2 with the cartridge fully inserted in the disk drive and the heads thereof in position to read or write data.

A window 48 in one corner of the housing 35 provides access for the read/write heads 36 and 38 and the arms 40 and 42 of the drive 32. The window 48 normally is covered by a shutter 50 when the cartridge 30 is outside the drive 32. The shutter 50 may be biased toward its closed position where it is latched closed. As shown in FIGS. 2 and 3, the shutter 50 is automatically opened during insertion and closed during ejection of the cartridge 30 from the disk drive 32 by a shutter opener arm 52. The shutter opener arm 52 normally is biased against a stop 53 so that it tends to remain in the ready position shown in FIG. 1. The cartridge 30 is inserted in the drive 32 by application of manual insertion force on the cartridge 30. As the cartridge 30 is being inserted, the arm 52 engages the shutter 50 when the cartridge 30 is in the partially inserted position shown in FIG. 2. Thereafter the shutter opener arm 52 unlatches the shutter 50 and opens it as the cartridge 30 moves to the fully inserted position shown in FIG. 3. When the shutter 50 has been opened, the arms 40 and 42 can position the heads 36 and 38 anywhere in the data storage area of the disk 34 for read and write operations. It should be noted that normally the arms 40 and 42 are parked and retained on a double sided ramp 54 by to prevent damage due to impact to the drive 32. When a cartridge 30 is not in the drive 32, the arms 40 and 42 are locked on the ramp 54 by a retention lever 56. The lever 56 contacts a cam 57 on the actuator 44 to maintain the arms 40 and 42 on the ramp 54 in the locked positions shown until the cartridge 30 is fully inserted in the disk drive 32. Then movement of an insertion/ejection pin 58, positioned for engagement with the back edge 59 of the housing 35 and mechanically linked to the lever 56, moves the lever 56 out of its locking position.

When the cartridge 30 is fully inserted within the drive 32, the spindle 60 thereof, is extended into engagement with the hub 62 of the disk 34. The spindle 60 includes a ring 63 of permanently magnetized material. The hub 62 is constructed from material susceptible to magnetic attraction and magnetically engages with the spindle 60 when they are moved close to each other. Thereafter, the spindle 60 rotates the disk 34 as is required for operation.

The cartridge 30 can be ejected from the drive 32 by software commands, through the use of a manual eject button 64, or by inserting a pin in an emergency eject hole 66 to directly move the release mechanism within the drive 32. When released, spring energy stored when the cartridge 30 was inserted is applied to the pin 58, which moves the cartridge 30 partially out of the drive 32 to a position where it can be manually removed therefrom. The ejection is also assisted by spring energy stored when the shutter opener arm 52 was pivoted during insertion.

The areas of the disk 34 on which data is written and read are never supposed to come into physical contact with other structure, because such physical contact causes damage to the very carefully applied magnetic material thereon. It is the prime function of the housing 35 and the shutter 50 to assure that no such contact ever occurs, yet allow free access by the read/write heads 36 and 38 and the arms 40 and 42, and fix the disk within certain tolerances so it is always successfully engaged by the spindle 60.

Figure 4:
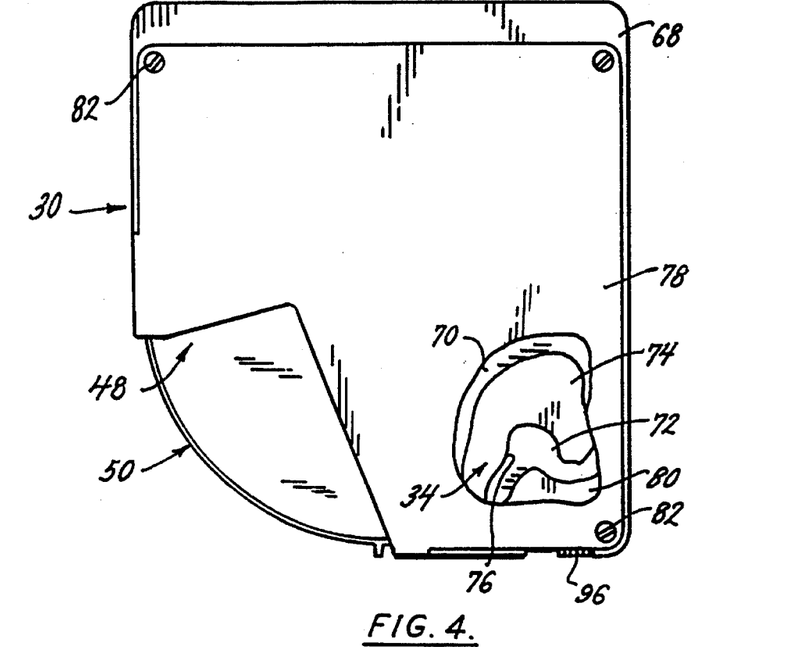
FIG. 4 is a top plan view of the cartridge of the present invention with its shutter in its closed position.
Figure 5:
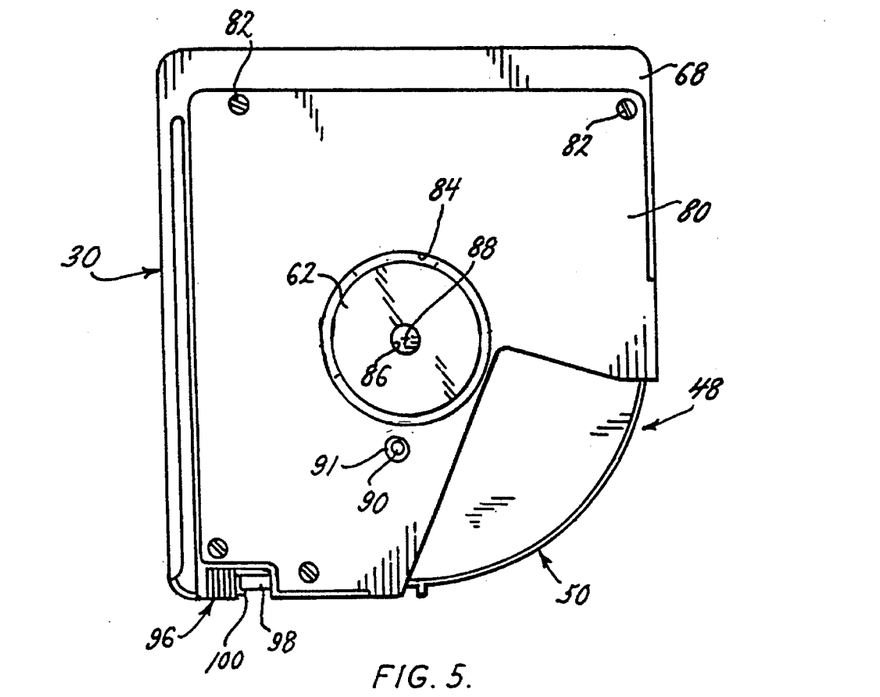
FIG. 5 is a bottom plan view of the cartridge of FIG. 4.

The cartridge 30 is shown in top plan view in FIG. 4 and in bottom plan view in FIG. 5. The housing 35 thereof includes a peripheral frame 68 which extends about 270 around the disk 34. An upper inner sheet 70 and a lower inner sheet 72 are attached to the frame 68, spaced from and generally parallel to, the upper and lower surfaces 74 and 76 of the disk 34. The upper and lower inner sheets 70 and 72 are permanently secured to the frame 68 by means such as screws, glue or fusion. The frame 68 also has upper and lower outer sheets 78 and 80 connected thereto by means such as the screws 82, although like the inner sheets 70 and 72, the outer sheets 78 and 80, may be glued or fused to the frame 68. The outer sheets 78 and 80 also may be formed as the end portions of a single U-shaped member. Normally the frame 68 is constructed from plastic material, whereas the sheets 70, 72, 78 and 80 preferably are constructed from a magnetic shielding material, such as stainless steel. The double wall stainless steel construction tied together by the peripheral frame 68 provides a rigid housing 35 to prevent the aforementioned flexing, which might otherwise allow contact between the disk surfaces 74 or 76 and the inner sheets 70 or 72. The rigidity enables the housing 35 to be very thin with very small, internal clearances, while preventing disk damage under all but the most abusive conditions.

As shown in FIGS. 4, 5, 6 and 7, the lower inner and outer sheets 72 and 80, define a hub hole 84 through which the hub 62 of the disk 34 extends. The hub 62 includes a cylindrical centering orifice 86 aligned with the normal rotational axis 88 of the disk 34. The orifice 86, in combination with a locating hole 90 with a chamfered outer end 91 that also extends through the lower outer sheet 80, allows the drive 32 to precisely maintain the position of the disk 34 within the housing 35 as the disk 34 is spun by the spindle 60 as shown in FIG. 1. The spindle 60 includes a protrusion 92 with a chamfered outer end 93 which engages the orifice 86, when the spindle 60 is raised in its operating position after the cartridge 30 is fully inserted. Both the spindle 60 and a locating pin 94 move upwardly in the direction of arrow 95 (FIG. 1) when the cartridge 30 is fully seated within the drive 32 to complete the positioning process. The chamfered outer end 91 assists in seating the locating pin 94 within the locating hole 90 while the chamfered outer end 93 assists in seating the spindle protrusion 92 in the orifice 86.

The housing 35 also includes a write protect slider 96, which is retained on a track 98 having a ridge 100 there across to establish two stable positions of the slider 96, either the position shown in FIGS. 4 and 5 wherein writing would normally be enabled, or the opposite position where disk writing is prohibited.

Figure 6:
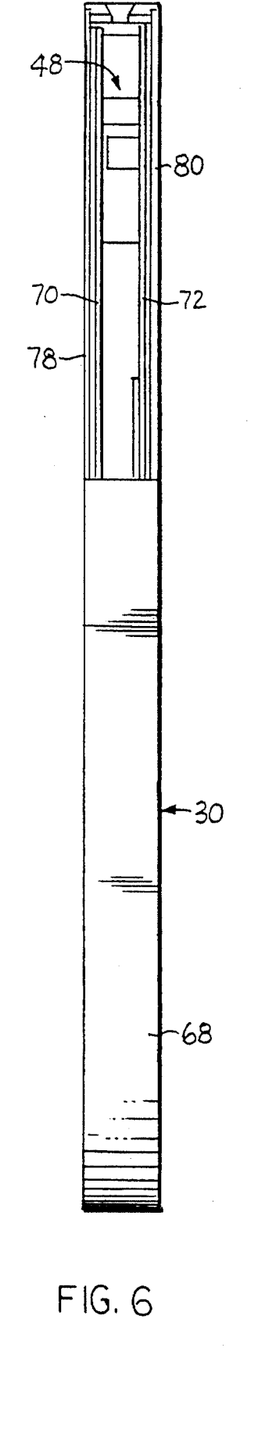
FIG. 6 is an edge view of the present cartridge with its shutter and disk removed.
Figure 7:
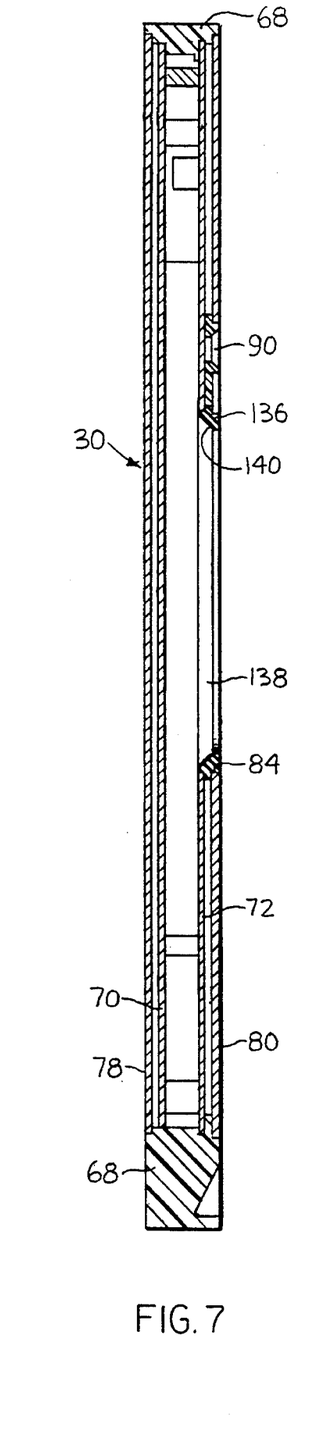
FIG. 7 is a cross-sectional edge view of the present cartridge with its disk and shutter removed.
Figure 8:
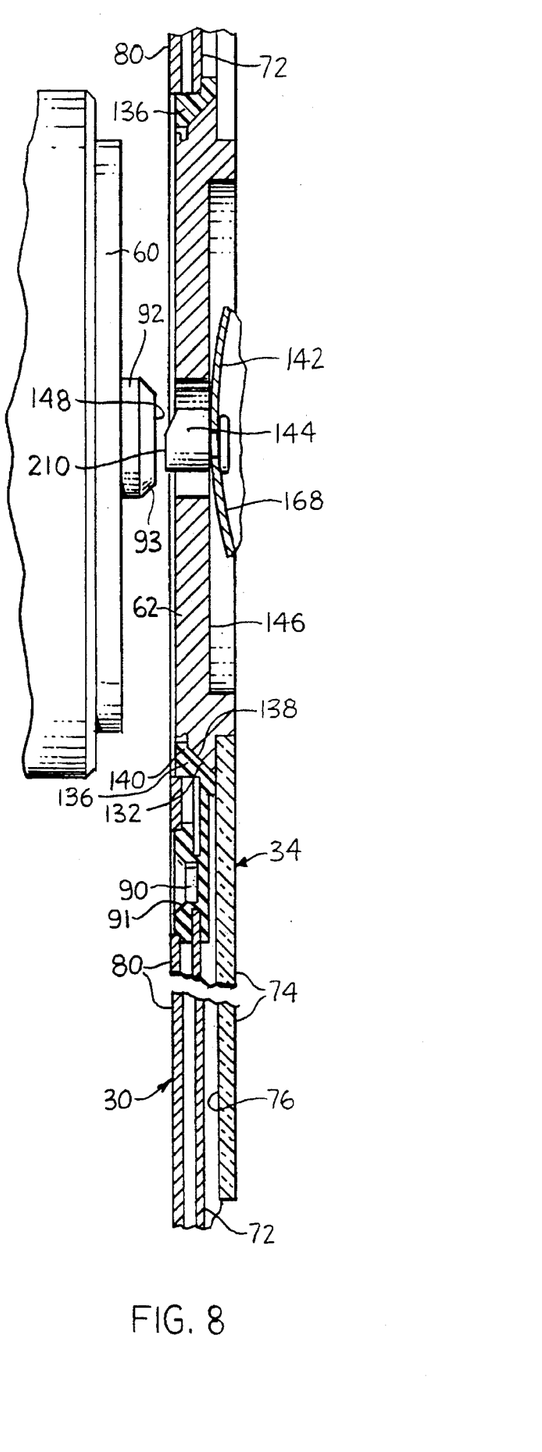
FIG. 8 is an enlarged cross-sectional view of the hub portion of FIG. 7 with a disk being restrained by a snap spring.

As shown in FIGS. 6, 7 and 8, the disk hub 62 includes a frustum shaped abutment surface 132 about its periphery and the hub hole 84 in the lower inner and outer sheets 72 and 80 has a plastic abutment ring 136 therein, which includes a frustum shaped radial abutment surface 138 facing the abutment surface 132 for engagement therewith. When the disk 34 is forced downwardly, the frustum surfaces 132 and 138 assure centering of the hub 62 within the hub hole 84.

Figure 9:
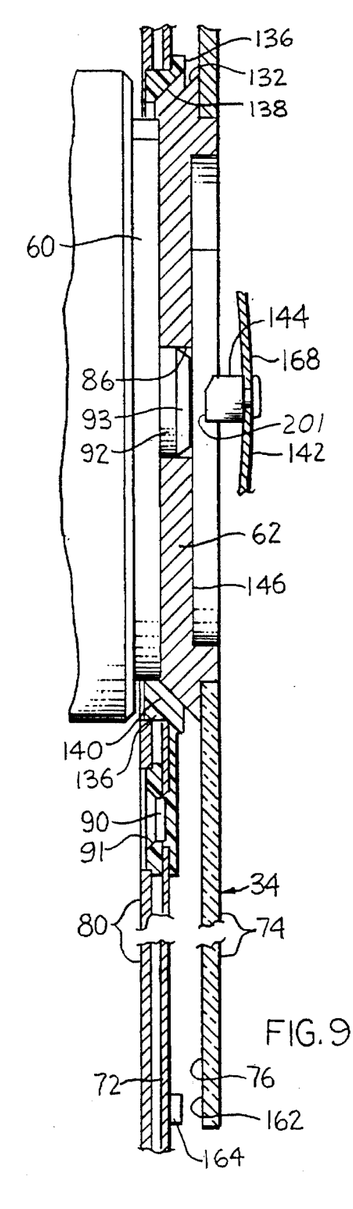
FIG. 9 is an enlarged cross-sectional view similar to FIG. 8 with the snap spring in its released position.
Figure 10:
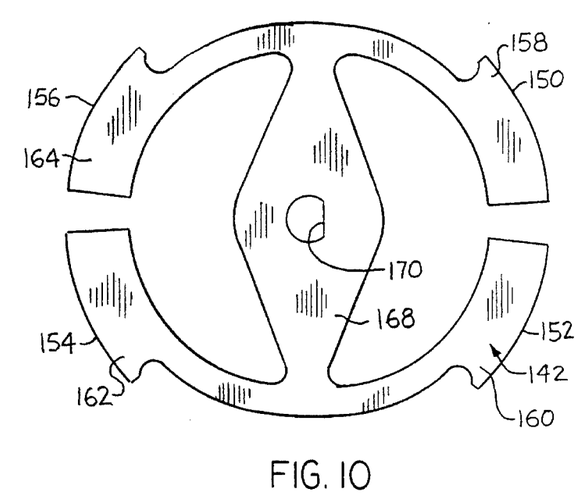
FIG. 10 is an enlarged plan view of an unstressed snap spring.

When the cartridge 30 is inserted in a disk drive 32 that does not have a horizontal orientation, it is undesirable that the disk 34 move sidewardly in the housing 35 before it is engaged by the spindle 60. Also, when the cartridge 30 is not in use, it is desirable to restrict movement of the disk 34 therewithin to assure that impact forces applied to the cartridge 30 do not momentarily cause the surfaces 74 and 76 of the disk to come in contact with either of the inner sheets, 70 or 72. Therefore, disk immobilizing means 140 are provided, the snap spring 142 and actuator button 144 thereof being shown in FIG. 8. When the snap spring 142 is in the position shown in FIG. 8, it presses on an inner radial surface 146 of the hub 62 to force the surfaces 132 and 138 together until the surface 76 engages the radial abutment surface 147 of the abutment ring 136. This assures that the disk 34 remains parallel to the cartridge 30. A tolerance build up during manufacture can result in incomplete seating of the surface 76 and radial abutment surface 147 with the disk being immobilized by contact between the frustum surfaces 132 and 138. However, it is a rare occurrence when no portions of the surface 76 and the radial abutment surface 147 are in engagement. Such rare occurrence can only happen when the disk 34 is generally parallel to the cartridge 30 as is desired anyhow. As can be seen in FIG. 9, when the protrusion 92 enters the hub hole 84, its outer surface 148 pushes the button 144, causing the snap spring 142 to move to the release position shown where it no longer contacts the surface 146.

Figure 11:
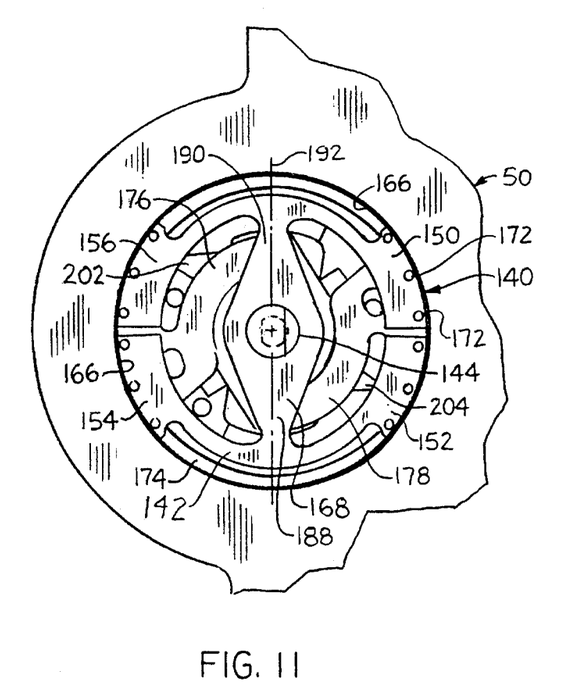
FIG. 11 is an enlarged cross-sectional view of the snap spring, cam and cam follower making up the immobilizer means for the present cartridge.
Figure 12:
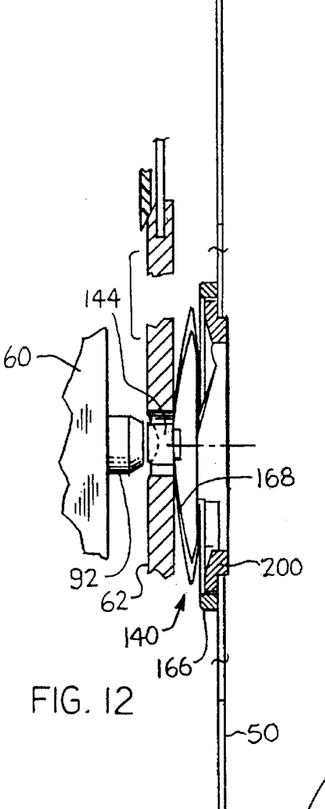
FIG. 12 is an underside view of the snap spring and cam follower.

The disk mobilizing means 140 and its components are shown in detail in FIGS. 10 through 15. The snap spring 142 is shown in its unstressed planer state in FIG. 10. The unstressed spring 142 has a semi-elliptical outer edge made up of edge sections 150, 152, 154 and 156 of spring stress edge portions 158, 160, 162 and 164 respectively. The portions 158, 160, 162 and 164 are stressed and connected to a circular ring 166. As shown in FIGS. 11 and 12, the stresses transfer to a center portion 168 causing the spring 142 to become bowed. The center portion 168 has two stable bowed positions, shown in FIGS. 8 and 9, out of the plane of the edges 150, 152, 154 and 156. An opening 170 is provided in the center portion 168 so that the button 144 can be oriented and permanently attached thereto such as by welding or melt forming.

Figure 13:
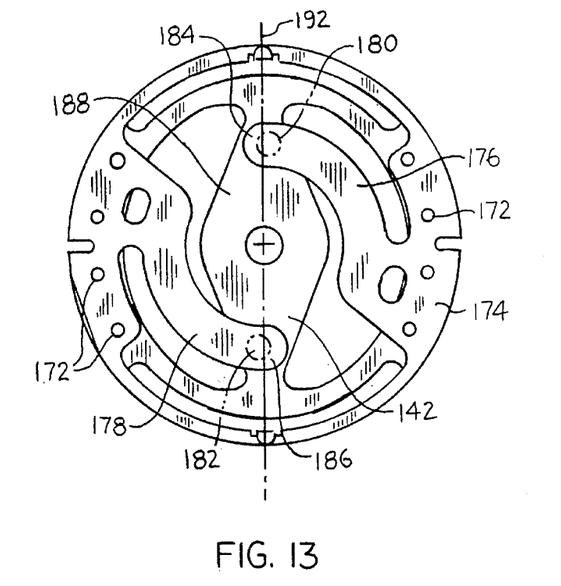
FIG. 13 is a top side view of the snap spring and cam follower of FIG. 12.
Figure 14:
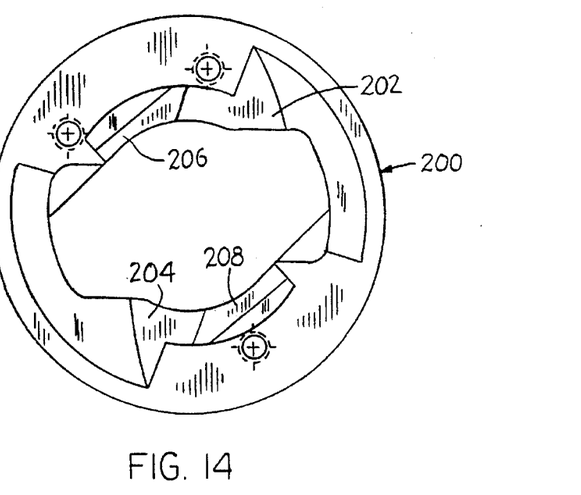
FIG. 14 is a plan view of the cam.
Figure 15:
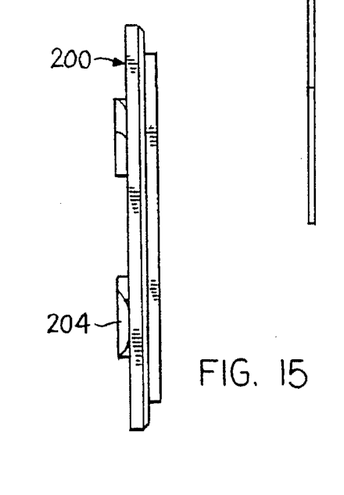
FIG. 15 is a side view of the cam of FIG. 14.

As shown in FIGS. 11 and 13, spot welds 172 in the edge portions 158, 160, 162 and 164 connect them to a ring member 174 from which cam follower arms 176 and 178 inwardly extend. The cam follower arms 176 and 178 have contact bulges 180 and 182 positioned at their ends 184 and 186 to contact intermediate locations 188 and 190 on the snap spring center portion 168. Note that the contact points 188 and 190 are slightly offset from the central axis 192 of the snap spring center portion 168. This offset reduces the force required for the cam follower arms 176 and 178 to move the center portion 168 over center. The offset force causes a slight twisting of the center portion 168, which allows the center portion 168 to go over center with less force than would be required if it was moved symmetrically.

The force required on the arms 176 and 178 is provided by a cam 200, which is fixed to the shutter 50 for rotational therewith. The cam 200 includes opposite ramp cam surfaces 202 and 204. When the cam 200 is twisted by closing of the shutter 50, at least one of the ramp cam surfaces 202 or 204 increasingly presses on the arm 176 or 178, forcing the snap spring center portion 168 to snap past the plane of the edges 150, 152, 154 and 156 as shown in FIG. 8. Usually one of the ramp cam surfaces 202 or 204 is constructed a little higher so that before snapping, the snap spring 142 is stressed into an S shape, which is less stressful than the M shape that occurs when the spring 142 is deformed equally at two opposite locations. As long as the shutter 50 is closed, surfaces 206 and 208 of the cam 200 block motion of the snap spring 142 transmitted through the arms 176 and 178 so that any forces trying to return it to the release position of FIG. 9 cannot move it far enough to have it snap to such release position. However when the shutter 50 is opened during insertion into a disk drive 32, the cam surfaces 206 and 208 are twisted so they no longer block the cam follower arms 176 and 178. Thereafter, as shown in FIG. 12, the protrusion 92 contacts the actuator button 144 to move the snap spring center portion 168 from the position shown in FIGS. 8 and 12 to the release position where the center portion 168 has a bow in the opposite direction (FIG. 9). At that point the snap spring center portion 168 no longer immobilizes the disk 34 by pushing on the hub 62, which thereafter is free to move with the spindle 60. Note that the contact end 210 is chamfered so that the protrusion 92 applies force to the spring center portion 168 out of alignment with the axis 192 of the center portion 168. This causes a slight sideward bending of the center portion 168 and reduces the force required to snap it over center. The hole 170 in which the button 144 is mounted is D-shaped so the button cannot turn to misalign the end 210.

When the cartridge 30 is being removed from the drive 32 the spindle 60 is retracted. And as the cartridge 30 ejects from the drive 32, the shutter 50 is closed by the shutter opener on 52, twisting the cam 200 and causing the snap spring center portion 168 to return to that shown in FIG. 12 immobilizing the disk 34 through contact with the surface 146.

Thus, there has been shown and described novel means to assure engagement of removable storage media with a disk drive, which fulfills all the objects and advantages sought therefor. Many changes, alterations, modifications and other uses and applications of the subject means will become apparent to those skilled in the art after considering the specification, together with the accompanying drawings. All such changes, alterations and modifications which do not depart from the spirit and scope of the invention are deemed to be covered by the invention, which is limited only by the claims that follow:

We claim:

1. A cartridge for a data storage disk drive including:
   a disk having:
      a hub for engagement with a disk drive spindle; and
      a disk parking abutment surface;
   a housing containing said disk, said housing including:
      a housing peripheral edge portion;
      first and second housing side portions on opposite sides of said housing peripheral edge portion having:
         a window area for read/write head access to said disk defined thereby, said second housing side portion also having:
         an opening for said hub therein; and
         a housing abutment surface about said opening in said second housing side portion facing said disk parking abutment surface and positioned for engagement therewith;
   a shutter mounted to said housing having:
      a first position covering said window area; and
      a second position uncovering said window area; and
   disk immobilization means to urge said disk parking abutment surface into abutment with said housing abutment surface when said shutter is in said first position, said disk immobilization means including:
      a snap spring positioned adjacent said hub having:
         a first stable position in contact with said hub wherein said snap spring urges said disk parking abutment surface into abutment with said housing abutment surface;
         a second stable position wherein said snap spring is positioned out of contact with said hub.

2. The cartridge as defined in claim 1 wherein said snap spring further includes:
   a snap spring center, and wherein said disk immobilization means further include:
   an abutment button mounted at said snap spring center, said abutment button including:
      a button abutment surface positioned for engagement with a disk drive spindle as the disk drive spindle engages said hub to force said abutment button to move said snap spring to said second stable position with said button abutment surface out of engagement with the disk drive spindle.

3. The cartridge as defined in claim 2 wherein said snap spring center has:

a center axis, and said button abutment surface is offset from said center axis of said snap spring center so that engagement with the disk drive spindle applies non-symmetrical stress to said snap spring.

4. The cartridge as defined in claim 3 wherein said snap spring center includes:
   a non-circular orifice thereat, said abutment button having:
      a spring attachment portion that extends within and engages said non-circular orifice, whereby said abutment button is restrained from rotation with respect to said snap spring.

5. The cartridge as defined in claim 4 wherein said snap spring includes:
   a generally trapezoidal snap portion about said snap spring center having:
      a major axis; and
      a minor axis at a right angle to said major axis; and
      first and second generally planar portions connected to said generally trapezoidal snap portion at said major axis on opposite sides of said snap spring center.

6. The cartridge as defined in claim 1 wherein said disk immobilization means further include:
   a cam operatively connected to said shutter, said cam including:
      at least one cam surface positioned to cause said snap spring to snap to said first stable position thereof as said shutter moves from said second position to said first position.

7. The cartridge as defined in claim 6 wherein said disk immobilization means further include:
   a cam follower positioned between said snap spring and said cam to be moved by said at least one cam surface as said shutter moves from said second position to said first position, said cam follower operatively connecting said at least one cam surface to said snap spring to cause said snap spring to be in said first stable position when said shutter is in said first position.

8. The cartridge as defined in claim 7 wherein said cam includes:
   first and second cam surfaces, and said cam follower includes:
   a first resilient arm having:
      a first abutment portion positioned for engagement with said first cam surface; and
      a second abutment portion positioned for engagement with said snap spring.

9. The cartridge as defined in claim 8 wherein said snap spring includes:
   a snap portion about said snap spring center having:
      a major axis, said second abutment portion engaging said snap spring spaced from said snap spring center and to the side of said major axis.

10. A data storage device including:
    a disk drive including:
       means for receiving a removable disk cartridge;
       a spindle having:
          a centering protrusion; and
    a removable disk cartridge for use in said disk drive having:
       a disk for data storage including:
          a hub; and
       a housing in which said disk can be spun by said spindle when said hub is engaged therewith, said housing including:
          disk retention means to immobilize said disk when said disk is disengaged from said spindle including:
             bi-stable means having:
                a first stable position forcing said hub toward said housing; and
                a second stable position that does not force said hub toward said housing.

11. The data storage device as defined in claim 10 wherein said hub includes:
    a frusto-conical disk centering abutment surface, wherein said housing includes:
       an opening in which said hub extends; and
       an abutment member about said opening including:
          a frusto-conical housing abutment surface facing said frusto-conical disk centering abutment surface and positioned for engagement therewith for centering said hub in said opening; and
          a radial ring abutment surface facing said disk and positioned for engagement therewith for immobilizing said disk, and wherein said disk retention means further include:
       an actuator member positioned to engage said centering protrusion when said disk is engaging with said spindle to force said bi-stable means to said second stable position.

12. The data storage device as defined in claim 10 wherein said housing includes:
    a disk access shutter connected for rotation with respect to said housing having:
       an open position allowing access to said disk; and
       a closed position restricting access to said disk, and wherein said disk retention means include:
    cam means positioned adjacent said bi-stable means and connected to said disk access shutter to be rotated by rotation of said disk access shutter toward its closed position to force said bi-stable means to said first stable position.

13. A cartridge for a data storage disk drive including:
    a disk having:
       a hub for engagement with a disk drive spindle; and
       a disk parking abutment surface;
    a housing containing said disk, said housing including:
       a housing peripheral edge portion;
       first and second housing side portions on opposite sides of said housing peripheral edge portion having:
          a window area for read/write head access to said disk defined thereby, said second housing side portion also having:
             an opening for said hub therein; and
             a housing abutment surface about said opening in said second housing side portion facing said disk parking abutment surface and positioned for engagement therewith;
    a shutter mounted to said housing having:
       a first position covering said window area; and
       a second position uncovering said window area;
    a spring positioned adjacent said hub and operatively connected to said shutter, said spring having:
       a first stable position in which said spring is operatively connected to said disk to bias said disk parking abutment surface into engagement with said housing abutment surface; and
       a second stable position in which said spring is operatively disconnected from said disk; and
    spring activator means operatively connected between said shutter and said spring to force said spring toward said first stable position when said shutter is not in said second position.

14. A cartridge for a data storage disk drive including:
a disk having:
   a hub for engagement with a disk drive spindle; and
   a disk parking abutment surface;
a housing containing said disk, said housing including:
   a housing peripheral edge portion;
   first and second housing side portions on opposite sides of said housing peripheral edge portion having:
      a window area for read/write head access to said disk defined thereby, said second housing side portion also having:
      an opening for said hub therein; and
      a housing abutment surface about said opening in said second housing side portion facing said disk parking abutment surface and positioned for engagement therewith;
a shutter mounted to said housing having:
   a first position covering said window area; and
   a second position uncovering said window area; an overcenter spring positioned adjacent said hub having:
      a first stable position wherein said disk parking abutment surface is biased into engagement with said housing abutment surface; and
      a second stable position wherein said disk parking abutment surface is free to move with respect to said housing abutment surface; and
a spring activator positioned for contact with a disk drive spindle and operatively connected to said overcenter spring to force said overcenter spring toward its second stable position when said hub is engaging the disk drive spindle.

15. A cartridge for a data storage disk drive including:
a disk having:
   an outer radial ring portion for storing data;
   an inner ring portion;
   an axis about which said disk is rotatable, said axis being perpendicular to said outer radial ring portion; and
   a hub;
a housing containing said disk, said housing including:
   a housing peripheral edge portion;
   first and second housing side portions defining a window area for access to said disk;
a shutter for said window area mounted to said housing having:
   an open position; and
   a closed position; and
disk retention means operatively connected to said shutter to force said hub toward said second housing side portion when said shutter moves from said open position to said closed position so said disk is retained in a secure position within said housing, said disk retention means including:
   a bi-stable member having:
      a first stable position that retains said hub toward said second housing side portion; and
      a second stable position that allows said hub to move with respect to said second housing side portion.

16. The cartridge as defined in claim 15 including:
activation means connected to said shutter and operatively connected to said bi-stable member to assure said bi-stable member is in said first stable position before said shutter is fully moved to said closed position.

17. The cartridge as defined in claim 16 wherein said activation means includes:
   a cam connected to move with said shutter; and
   a cam follower positioned to be moved against said bistable member by movement of said cam with said shutter toward said closed position.

18. The cartridge as defined in claim 15 wherein said hub is adapted for engagement with a spindle of a data storage disk drive, said cartridge further including:
   activation means connected to said bi-stable member to assure said bi-stable member is in said second stable position when said disk is engaged with the spindle of a data storage disk drive.

19. The cartridge as defined in claim 18 wherein said activation means include:
   a button generally aligned with said axis and extending through said hub for contact with said bi-stable member and the spindle of a data storage disk drive.

20. A cartridge for a data storage disk drive including:
a disk having:
   a hub for engagement with a disk drive spindle; and
   a disk parking abutment surface;
a housing containing said disk, said housing including:
   a housing peripheral edge portion;
   first and second housing side portions on opposite sides of said housing peripheral edge portion having:
      a window area for read/write head access to said disk defined thereby, said second housing side portion also having:
      an opening for said hub therein; and
      a housing abutment surface about said opening in said second housing side portion facing said disk parking abutment surface and positioned for engagement therewith;
a shutter mounted to said housing having:
   a first position covering said window area; and
   a second position uncovering said window area;
a spring positioned adjacent said hub and operatively connected to said shutter, said spring having:
   a first stable free standing position in which said spring is operatively connected to said disk to urge said disk parking abutment surface into engagement with said housing abutment surface; and
   a second stable free standing position wherein said spring is operatively disconnected from said disk; and
a spring activator connected to said spring and positioned to be contacted by a disk drive spindle to urge said spring to its second stable position when said hub is engaged with the disk drive spindle and said shutter is not in said first position.

* * * * *